United States Patent [19]

Kitano et al.

[11] 4,234,925
[45] Nov. 18, 1980

[54] CONTROL SYSTEMS FOR GENERATORS

[75] Inventors: Yuichi Kitano, Kawagoe; Kaiichirou Hirayama, Tokorozawa, both of Japan

[73] Assignee: Tokyo Shibaura Denki Kabushiki Kaisha, Kanagawa, Japan

[21] Appl. No.: 865,419

[22] Filed: Dec. 29, 1977

Related U.S. Application Data

[63] Continuation of Ser. No. 626,103, Oct. 28, 1975, abandoned.

[30] Foreign Application Priority Data

Oct. 29, 1974 [JP] Japan .................................. 49-123978

[51] Int. Cl.² ............................................... G21C 7/00
[52] U.S. Cl. ........................................ 364/494; 176/3; 364/105
[58] Field of Search ............... 364/492, 105, 494, 495; 176/1–9, 20 R; 290/40 R, 40 C

[56] References Cited

U.S. PATENT DOCUMENTS

| | | | |
|---|---|---|---|
| 3,015,748 | 1/1962 | Hartwig et al. | 176/7 |
| 3,504,187 | 3/1970 | Laudel, Jr. | 290/40 |
| 3,612,892 | 10/1971 | Nobile et al. | 290/40 |
| 3,663,362 | 5/1972 | Stix | 176/4 |
| 3,741,246 | 6/1973 | Braytenbah | 290/40 |
| 3,866,108 | 2/1975 | Yannone et al. | 290/40 |

OTHER PUBLICATIONS

Steiner, D., The Technological Requirements for Power by Fusion, Nuclear Science and Engineering, vol. 58, No. 2, Oct. 1975, pp. 107–108.

*Primary Examiner*—Errol A. Krass
*Attorney, Agent, or Firm*—Stevens, Davis, Miller & Mosher

[57] ABSTRACT

In a generator feeding a load that requires a current of special waveform, for example a nuclear fusion reactor laboratory equipment, the field excitation of the generator is controlled to meet the requirement of the load by means of a computer which generates a control signal to provide an optimum excitation to the generator for meeting the requirement of the load.

3 Claims, 10 Drawing Figures

CONTROL SYSTEMS FOR GENERATORS

This is a continuation of application Ser. No. 626,103 filed Oct. 28, 1975 and now abandoned.

BACKGROUND OF THE INVENTION

This invention relates to a system for controlling a generator, more particularly to a system for controlling the field excitation of a synchronous generator by means of a digital electronic computer.

Due to a rapid increase in the population of the world and improvement in the living standard, the energy comsumption of the world is increasing year after year, and the total energy consumption during the interval of from 1970 to 2050 is estimated to be about 100 Q ($1Q = 3 \times 10^{14}$ KHW). The total amount of available fossil fuels including coal, petroleum and natural gas is estimated to be about 100Q. In other words, at about the middle of the 21th century, the fossil fuel will be exhausted. In addition, combustion of fossil fuels results in pollution of the atmosphere which greatly affects the weather of the earth as well as the living environment of life. For this reason, development of new energy sources is necessary, especially in countries deficient in the natural resource of fossil fuels.

One of the energy resources other than fossil fuels is solar energy. The technique of utilizing solar energy is called sun shine project. However, solar energy now actually used is only a fraction of the total energy available, and many problems still remain to be solved in the future. Another energy source is hydroelectric power. However, the amount of hydroelectric power available per year is only about 0.05 Q which is only a fraction of the total energy demand. Other resources include wind power, tidal power, the heat of the earth, etc., but the energy generated by these resources is very small.

The only other abundant energy resource is nuclear energy which can be released by fusion reactions and fission reactions. The latter reactions are now utilized in nuclear power plants. However, the amount of uranium and thorium ores that can be used is estimated to be only about 100 Q. Moreover, there are many problems such as radioactive discards, risk of run out as well as limits on the site of the plant.

As is well known in the art the fusion reaction involves a D-D reaction and a D-T reaction, where D represents deuteron and T tritium. Deuterons used in the D-D reaction are present abundantly in sea water and estimated to amount to $10^{10}$ Q. The fusion reaction is a reaction in which two light weight atomic nuclei are caused to collide with each other at a speed higher than a critical speed so as to cause an exothermic reaction thereby forming a slightly heavier nuclei, for example helium. In nature, such reactions are found in lightening, aurora, ionized layers and the sun. Accordingly, in order to utilize the fusion reactions as a source of energy it is necessary to establish a state (a high temperature plasma) resembling the state existing in the central portion of the sun. In the case of the sun, the high temperature plasma state is confined in the central portion by gravity, that is a huge mass. On the earth, however, as it is impossible to use such a huge mass, a magnetic field is used.

Figure 1:
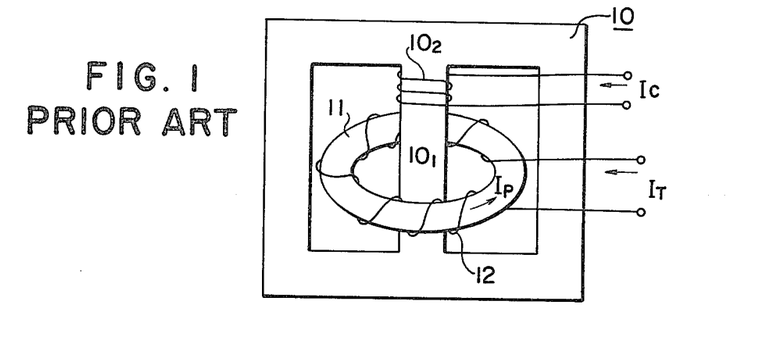
FIG. 1 is a diagram showing the principle of a plasma device.

The basic construction of a fusion reactor of laboratory scale is shown in FIG. 1. As shown, a primary winding $10_2$ and an annular tube 11 containing inonizable gas and acting as a secondary winding are wound on the center leg $10_1$ of the core of a transformer 10. When current Ic flowing through the primary winding $10_2$ is varied rapidly a plasma current Ip flows through the ionized gas. The fusion reaction is effected by the Joule heat generated by the plasma curent Ip. Since such fusion reaction terminates in an extremely short time, it is necessary to seal new ionized gas in the discharge tube 11 for passing plasma current. In a present day fusion experiment, it is necessary to repeat such cycle of operation at an interval of several minutes.

As the plasma comes into contact with the wall surface of the annular discharge tube 11, the plasma is cooled so that the plasma current diminishes rapidly. Accordingly, it is necessary to confine the plasma inside of the tube or at the central portion thereof so as to prevent the plasma current from coming into contact with the wall surface. To this end, a toroidal field coil 12 is wound about the discharge tube 11.

If the current $I_T$ flowing through the field coil takes the form of a regular rectangular waveform as shown in FIG. 2a, the amplitude of the field is constant during an interval T between the build-up and build-down of the current. This means that the pimary current Ic or the plasma ignition may be passed at any time during the interval T which is advantageous in that not only is the experiment greatly facilitated but also the power loss of the field coil 12 is zero until the current $I_T$ bulds up to a prescribed value.

Figure 2:
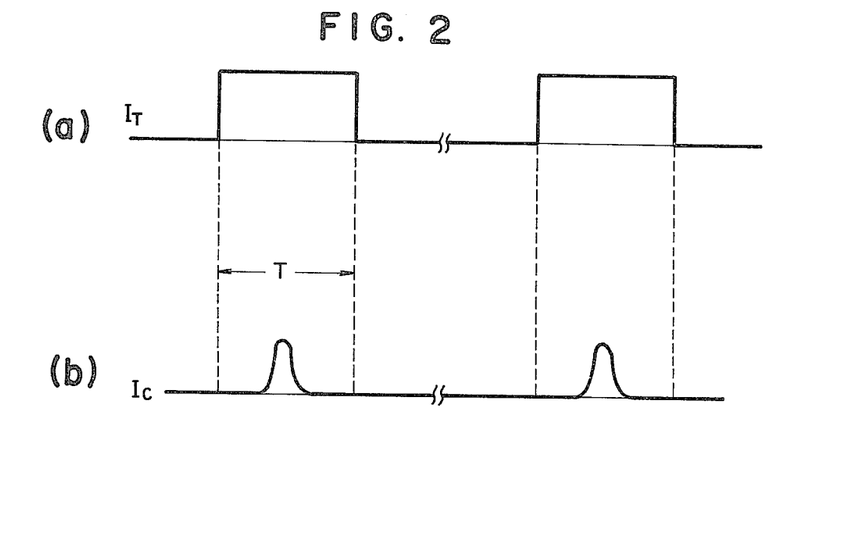
FIGS. 2a and 2b show the field coil current and the primary current of the plasma device shown in FIG. 1.

Actually, however, it is impossible to make rectangular the field coil current $I_T$ as shown in FIG. 2 due to the time constant of the source supplying the current $I_T$ and the time constant of the coil 12 itself. More particularly, the capacity of the source must be large in order to confine the high temperature plasma current in the tube by a magnetic field but it not necessary to continuously pass current. Thus it is necessary to pass current for an extremely short duration of an order of one second at an interval of several seconds. Accordingly, the utilization factor of the source is very low and it is not permissible to periodically supply such large power directly from distribution lines. A turbine generator set may be installed instead of relying upon existing distribution lines but turbine generator sets introduce problems of noise, polution of the air by smoke and large installation cost. Thus, such an independent power source is not suitable for research purpose. As described above, since it is necessary to pass a large current through the field coil 12 for only a short duration, a flywheel type motor generator set is most suitable for this purpose.

Figure 3:
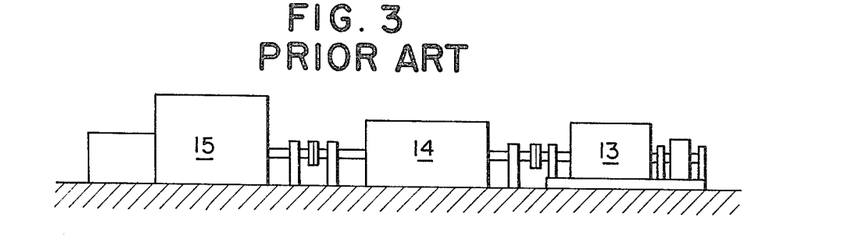
FIG. 3 is a side view of a conventional flywheel type motor generator set.

In a flywheel type motor generator set the flywheel is rotated by the motor to store energy in the flywheel and the stored energy is converted into electric energy by applying an excitation to the generator at required times. Such set is generally constructed as shown in FIG. 3, and comprises a driving motor 13, a flywheel 14 and a synchronous generator 15 which are directly coupled together. In one example, the generator has a capacity of 100 MW, the flywheel 14 has a flywheel effect of 33.5 ton $m^2$ and the motor 13 has a capacity of 2600 K.W. In this manner, the power rating of the motor may be only about 1/40 of the power source from which the field coil is energized. For this reason, flywheel type motor generator sets are used exclusively in most fusion laboratories.

Generally, the time constant, or the so-called open circuit time constant Tdc of the armature winding of the generator of a motor generator set is designed to be about 5–6 seconds. Accordingly, even when an excitation current is passed in the same manner as in ordinary generators, the output voltage would reach the prescribed value only after 5 to 6 seconds. Further, since the field coil 12 of a fusion laboratory has a time constant of about 0.8–1 second, it takes a substantial time until the field coil current $I_T$ builds up to the prescribed value after application of the field excitation.

Figure 4:
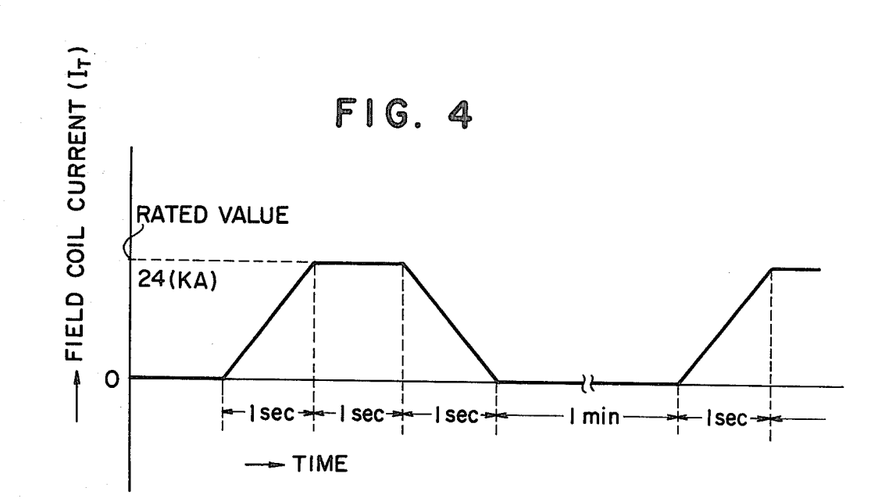
FIG. 4 is a graph showing the waveform of the field coil current produced by the control system embodying the invention.
Figure 5:
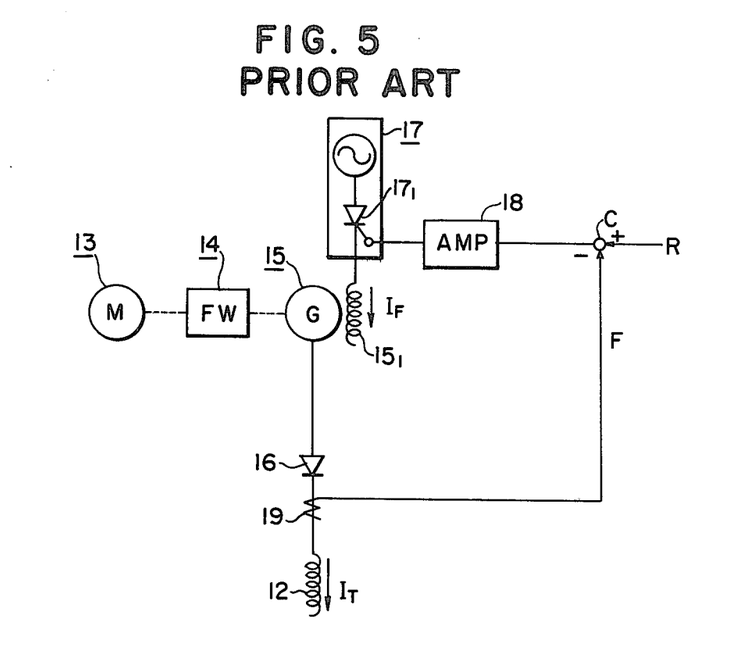
FIG. 5 is a diagram showing a flywheel type motor generator set provided with a conventional analogue feedback control system.
Figure 6:
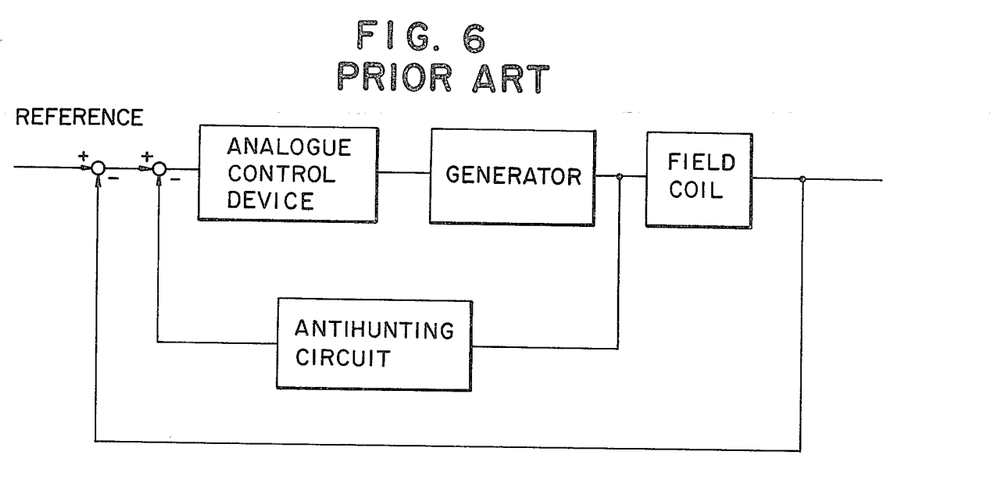
FIG. 6 is a block diagram showing an equivalent circuit of the system shown in FIG. 5.

In order to decrease the field coil loss and to establish a magnetic field which is maintained at a stable value for a given duration (for example, one second) it is advantageous to make the field coil current have a wave form in the shape of a frustum as shown in FIG. 4. However, it is difficult to produce a field coil current $I_T$ having such a waveform by an the analogue feedback control system shown in FIG. 5 which has been used in many cases. In the control system shown in FIG. 5, the field winding $I_F$ of a generator 15 driven by motor 13 is supplied with field current $I_F$ from an excitation source 17 via a thyristor $17_1$. The gate signal applied to the gate electrode of thyristor $17_1$ is derived from the generator though a rectifier 16, a DC transformer 19 for deriving a feedback signal F, a comparator C which compares feedback signal F with a reference signal R, and an amplifier 18. FIG. 6 is a block diagram showing an equivalent control system of the circuit shown in FIG. 5. This analogue feedback control system is characterized in that it operates stably regardless of the variation in the parameters of the control system (for example, variations in the field resistance caused by temperature rise) and that it is possible to eliminate any offset error by incorporating an integrating element into the control system.

In order to produce a current having a waveform as shown in FIG. 4 by this control system it is necessary to greatly increase the response speed of the control system. Although the system quickly responds to a given reference signal, overshooting and undershooting and hence hunting are inevitable because the feedback control system functions to follow up a deviation. Accordingly, the higher the response speed, the larger the hunting.

Figure 7:
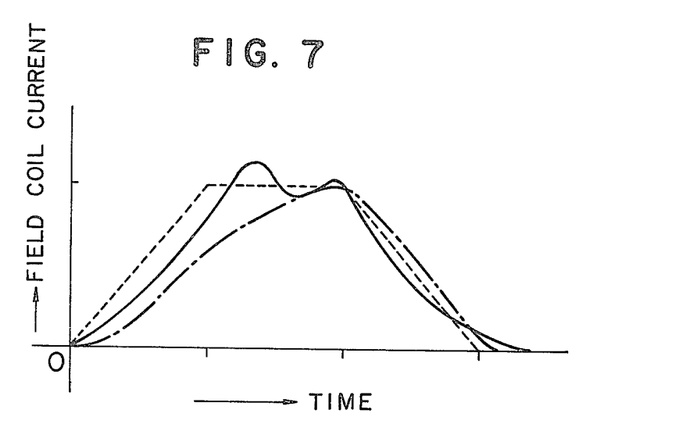
FIG. 7 is a graph showing the response characteristic of the system shown in FIG. 6.

The solid line shown in FIG. 7 represents the current waveform where the response speed of the control system is increased. In order to decrease the overshoot it is necessary to provide an overdamping by decreasing the gain of the system and to increase the feedback as shown by the dot and dash lines shown in FIG. 7.

In any case, these curves depart from the desired waveform shown by the dotted lines. As described above, in order to maintain the plasma confining field for more than one second it is necessary to maintain the flat portion of the current at a prescribed value for about one second. However, with a conventional analogue feedback control system, due to its time constant, the current begins to decay immediately after it has reached the prescribed value. For this reason, the prior art control system is not applicable to an electric source for fusion reaction laboratory equipments.

As a system for obviating these difficulties of the prior control systems a so-called optimum control system has been developed wherein control is performed in a minimum time while satisfying various restricting conditions of the component elements of the system. One example of the optimum control system involves a dynamic programming proposed by Bellman. However, this method requires that a large memory device and an electronic computer be used for solving cubic or more complicated equations. Thus, to solve the problems under restricting conditions, the computer is required to perform operations consuming many hours and to use a memory device having an extremely large capacity, for example several tens thousand words. In this manner, it is impractical to apply such dynamic programming to a control system because of its high price and time consuming operation.

SUMMARY OF THE INVENTION

Accordingly it is an object of this invention to provide an improved control system for a generator controlled by a quick operating and relatively inexpensive electronic computer which can generate current of a desired waveform under various restricting conditions.

A more specific object of this invention is to provide a control system for a generator for controlling a plasma device which might be utilized as a source of a nuclear fusion reactor and capable of supplying field excitation to the generator that can operate the plasma device under an optimum condition.

According to this invention, there is provided a control system for a generator having a field winding, a digital computer, a digital-analogue converter for converting the digital signal produced by the digital computer into an analogue signal, means responsive to the output from the digital-analogue converter for controlling the excitation of the field winding, a load energized by the generator, and means for causing the computer to generate an optimum control signal required by the characteristic of the load in accordance with predetermined conditions of the field voltage and the field current thereby controlling the field excitation of the generator in accordance with the optimum control signal.

Thus, it is a feature of this invention that the field excitation of a generator is controlled by an electronic computer while satisfying given restricting conditions of the field voltage and the field current. Briefly stated, according to this invention the optimum field excitation is provided by utilizing a characteristic such that a result approximating the result of a continuous system can be obtained by decreasing the sampling period in order to satisfy the necessary conditions for a time function derived by the Pontriagins maximum principle. In one example, the problem of providing an optimum control is solved by linear programming under the restricting conditions of the field voltage and current and by using the result as an input signal to the control apparatus.

DESCRIPTION OF THE PREFERRED EMBODIMENT

As is well known in the art, the field flux of a synchronous generator is increased or decreased in accordance with the phase of the armature current. In Park's equation, which is utilized to analyze the operation of a generator, the subtransient phenomenon (for example, the damper effect ordinarily is neglected because the frequency involved is only 2 to 3 Hz. Large field forcing is employed (by field forcing is meant that an excitation power of several to 10 times of the rated excitation capacity is applied in order to decrease the build-up time of the terminal voltage) and where the generator voltage is substantially equivalent to the voltage component along the g axis, the following equations hold.

$$\phi_d = X_{ad} \cdot i_{fd} - X_d \cdot i_d \quad (1)$$
$$\phi_{fd} = (X_{fd} + X_{ad}) i_{fd} - X_{ad} i$$
$$p_{fd} = \frac{1}{\omega_o} = \frac{t}{dt}(\phi_{fd}) + R_{fd} \cdot i_{fd}$$

where $\phi_{fd}$ represents the field flux, $\phi_d$ the direct axis component of the field flux, $X_{ad}$ the direct axis armature reaction, $X_d$ the synchronous reactance, $i_{fd}$ the field current, $f_d$ the current component along the direct axis, $X_{fd}$ the field reactance and $R_{fd}$ the field resistance.

In equation (1), when $i_{fd}$ and $\phi_{fd}$ are eliminated, equations (2) are obtained.

$$\phi_d = \frac{1}{1 + T_{do}' \cdot s} E_{fd} - \frac{X_d + X_d' \cdot T_{do}' s}{1 + T_{do}' \cdot s} \quad (2)$$
$$X_d' = X_d - \frac{(X_{ad})^2}{X_{fd} + X_{ad}}, \quad T_{do}' = \frac{X_{fd}}{\phi_o R_{fd}}$$
$$E_{fd} = \frac{X_{ad}}{R_{fd}} \cdot p_{fd}$$

Figure 8:
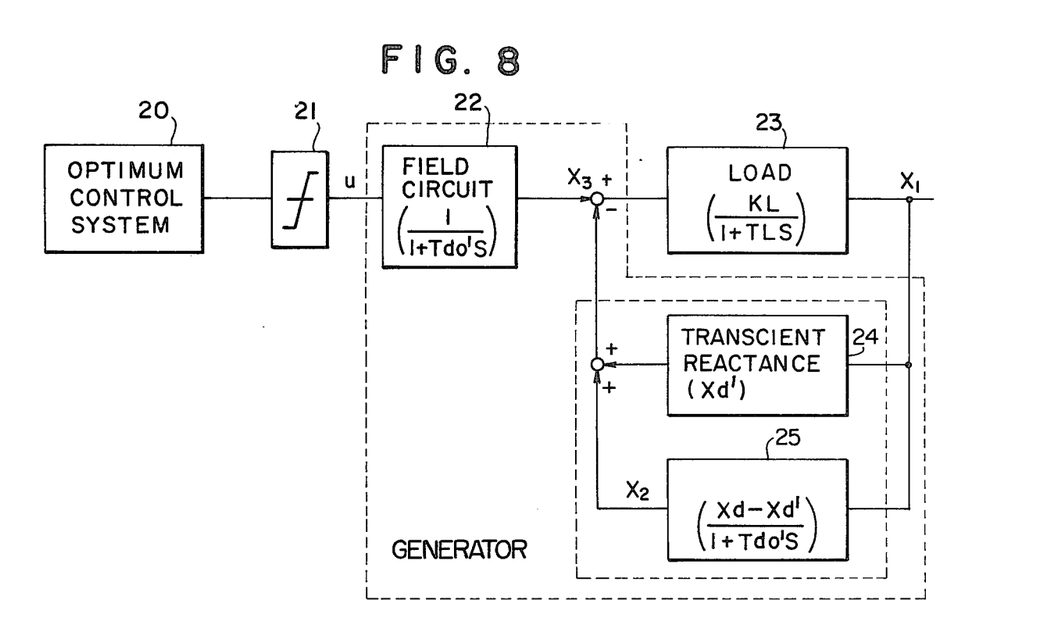
FIG. 8 is a block diagram showing one example of the control system embodying the invention.

FIG. 8 is a block diagram of the entire system depicted by utilizing these parameters. In FIG. 8, the optimum control system is designated by reference numeral 20 and the output thereof is applied to a block 22 representing the characteristic of the field circuit of the generator through a block 21 representing the maximum field voltage. In FIG. 8 and equations (2), $\tau$ represents the field voltage, $T_{do}'$ the open circuit time constant, and $X_3$ the generator field current. Block 23 represents the characteristic of the load (field coil 12), block 24 the transient reactance, block 25 the armature reactance of the synchronous generator, and $x_1$ the output current of the control system, that is the field coil current $I_T$. Differential equations of signals $x_1$, $x_2$ and $x_3$ shown in FIG. 8 are as follows:

$$\frac{dx_1}{dt} = \frac{1 + X_d' \cdot K_L}{T} x_1 - \frac{K_L}{T} x_2 + \frac{K_L}{T_L} x_3 \quad (3)$$
$$\frac{dx_2}{dt} = \frac{X_d - X_d'}{T_{do}'} x_1 - \frac{1}{T_{do}'} x_2$$
$$\frac{dx_3}{dt} = \frac{-1}{T_{do}'} x_3 + \mu$$

By converting equations (3) into vector differential equations, we obtain equation (4)

$$dx/dt = Ax + bu \quad (4)$$

wherein x represents a state variable description, A a state matrix and b a control vector, which correspond to the symbols shown in FIG. 8 and are expressed as follows:

$$x = \begin{pmatrix} x_1 \\ x_2 \\ x_3 \end{pmatrix}$$

$$A = \begin{pmatrix} -\frac{1 + K_L X_d}{T_L} & -\frac{K_L}{T_L} & \frac{K_L}{T_L} \\ \frac{X_d - X_d'}{T_{do}'} & -\frac{1}{T_{do}'} & 0 \\ 0 & 0 & -\frac{1}{T_{do}'} \end{pmatrix} \quad (5)$$

$$b = \begin{pmatrix} 0 \\ 0 \\ 1 \end{pmatrix}$$

By performing convolution integrals of the differential equation (4) at a sampling frequency of T, we obtain equation (6)

$$S(T) = l^{AT}(X_o + \int_o^T l^{-A\tau} \cdot b \cdot \mu(\tau) d\tau) \quad (6)$$

By the Taylor development of $e^{AT}$ and by denoting the first approximation thereof by P, we obtain equations (7) and (8)

$$e^{AT} \simeq P = I + A \cdot T \quad (7)$$

where I represents the current vector $$l^{AT} \int_o^T l^{-A} \cdot b \cdot \mu(\tau) d\tau = l^{A-1}(I - l^{-AT}) b \quad (8)$$

By Taylor development of the righthand term of equation (8) we obtain the following equation (9)

$$\epsilon^{AT} A^{-1}(I - \epsilon^{-AT})b = \quad (9)$$
$$(I = AT)A^{-1}(AT - \frac{(AT)^2}{2!} + \frac{(AT)^3}{3!} \cdots)b$$

From which $$e^{AT}A^{-1}(I - e^{-AT})b \simeq Q = T \cdot P \cdot (I - \tfrac{1}{2}AT)b \quad (10)$$

The state variable x (mT) after mT seconds starting from an initial value of $x_o$ is expressed by $$x(mT) = P^m x_0 + \sum_{i=0}^{m-1} P^{(m-1-i)} \cdot Q \cdot ud \qquad (11)$$

By denoting the target value by $x_{f1}$ and the permissible difference from the target value by $\epsilon$, we obtain $$\epsilon \geq |xf - x(mT)| \qquad (12)$$

Let us introduce an L matrix as shown by equation 13

$$L = [P^{m-1}Q P^{m-2}Q \ldots PQQ] \qquad (13)$$

The limit on the field voltage may be expressed by equation 14

$$\beta \geq ud \geq -\alpha \qquad (14)$$

where ud corresponds to the field voltage u shown in FIG. 8 and expressed by a mth order vector. The element of ud gives the field voltage at each sampling time.

From equation 15 we can derive equation 16

$$u_1 = ud + \alpha \qquad (15)$$

$$\alpha + b \geq u_1 \geq 0 \qquad (16)$$

From equations 11, 12, 13 and 15

$$\epsilon \geq |xf + L\alpha - L| \qquad (17)$$

In this control system, since the initial value is zero, it is assumed as follows $$x_0 = 0 \qquad (18)$$

If we express the upper limit of the field current by $I_{fdr}$, since the field current corresponds to $x_3$, by using a vector $$d = [0001] \qquad (19)$$

We can express the field current after mT seconds by the following equation (20)

$$I_{fd}(mT) = d \cdot x(mT) \qquad (20)$$

From equations 11, 13 and 20, we obtain $$I_{fd}(mT) = d \cdot L \cdot U_1 - d \cdot L \cdot \alpha \qquad (21)$$

Representing the field current $I_{fd}$ after $T \sim mT$ seconds by a row vector by using a matrix $$N = \begin{pmatrix} dQ & 0 & \ldots \ldots & 0 \\ dpQ & dQ & & \\ dp^{m-1}Q & dp^{m-2}Q & \ldots & dQ \end{pmatrix} \qquad (22)$$

$$I_{fd} = N \cdot U_1 - N \cdot \alpha \qquad (23)$$

Provided that $$I_{fd} = [I_{fd}(T) I_{fd}(2T) \ldots I_{fd}(mT)]^T \qquad (24)$$

Since all elements $I_{fd}$ should be smaller than $I_{fdr}$, if we use equation 25, it is necessary to satisfy equation 26.

$$I_{fdo} = [I_{fdr} I_{fdr} \ldots I_{fdr}] \qquad (25)$$

$$I_{fdo} \geq I_{fd} \qquad (26)$$

From these equations we obtain the following equations of condition $$\left.\begin{array}{l} \epsilon \geq |sf + L \cdot \alpha - L \cdot u_1 \\ \alpha + \beta \geq u_1 \\ I_{fdo} \geq I_{fd} \end{array}\right\} \qquad (27)$$

By using Slack variables $\lambda$, $\lambda'$, $\lambda''$, $\lambda'''$ and $\mu$ for the purpose of converting equation 27 into an equality, we obtain $$\left.\begin{array}{l} -\epsilon + L \cdot \mu_1 + \lambda = xf + L \cdot \alpha \\ -\epsilon + L \cdot \mu_1 - \mu + \lambda' = xf + L \cdot \alpha \\ u_1 + \lambda'' = \alpha + \beta \\ N \cdot u_1 + \lambda''' = I_{fdo} + N \cdot \alpha \end{array}\right\} \qquad (28)$$

provided that all variables in equation 28 are positive.

By expressing the target function $x_o$ by the following equation $$x_o = -\alpha \cdot \epsilon - M(\lambda'_1 + \lambda'_2 + \lambda'_3) \qquad (29)$$

the problem is to obtain a linear programming while satisfying equation 28.

In the above enumerated equations L represents a matrix of the $3 \times m$ order, $\epsilon$, $\lambda$, $\mu$, $\lambda'$ and $x_f$ vectors of the third order, $\alpha$, $\beta$, $u_1$, $\lambda''$, $\lambda'''$ and $I_{fdo}$ vectors of mth order, and N a matrix of $m \times m$th order. $\alpha$ and M in equation 29 represent weight coefficients. If we give a suitable small value to m, and if we increase the value until $\epsilon$ is included in a permissible error range the minimum solution of the value of m at that time will give the solution for the control of minimum time.

The value of T is selected such that as the sampling period T is decreased gradually a point will be reached beyond which the solution does not vary.

The actual field voltage u can be obtained by the following equation $$u = u_1 - \alpha \qquad (30)$$

Figure 9:
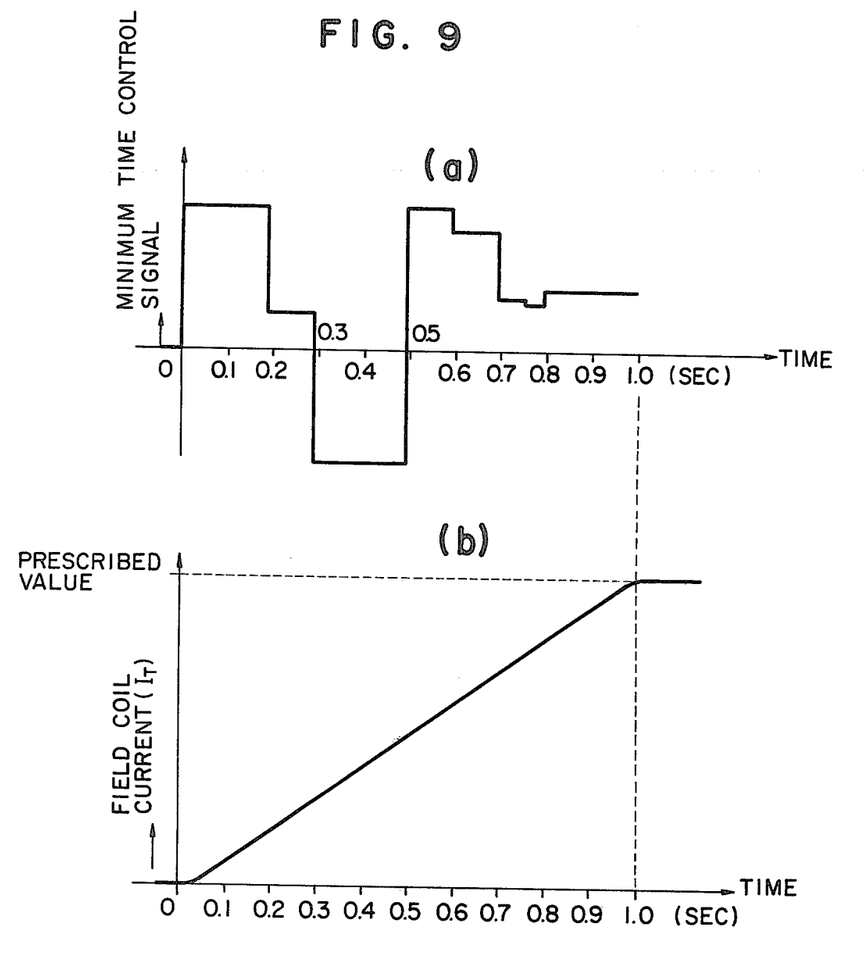
FIGS. 9a and 9b show waveforms of a minimum time control signal and the field coil current respectively.

FIG. 9a shows the characteristic of a minimum time control signal obtained by the above calculation. It can be consider that the curve also shows the waveform of the field voltage because as will be described later the delay caused by the converter and pulse generator is negligibly small. One example of the optimum control system is shown in FIG. 10.

Figure 10:
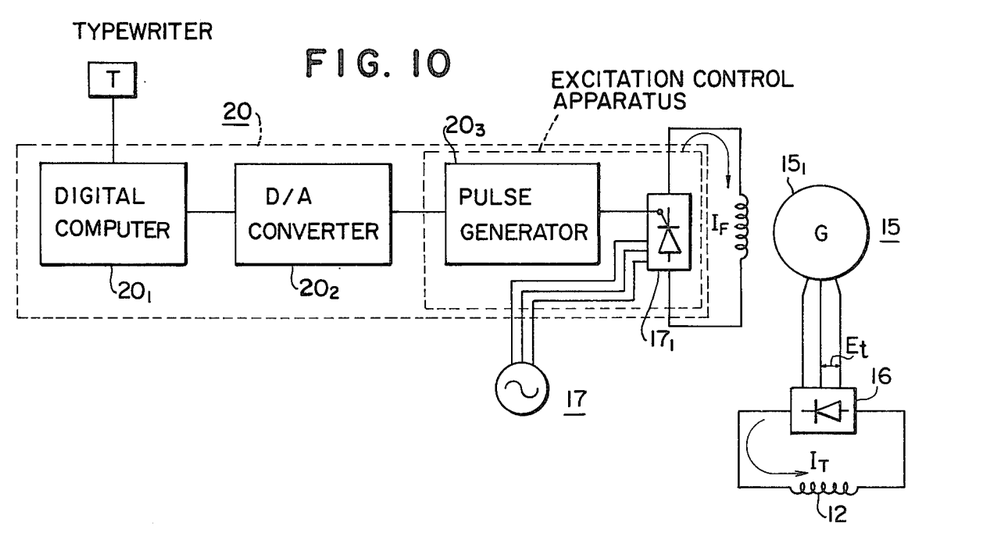
FIG. 10 is a block diagram illustrating one example of the control system embodying the invention.

The optimum control system shown in FIG. 10 comprises a digital computer $20_1$ (such as a Toshiba CTM-40C), a digital-analogue converter $20_2$, and a pulse generator $20_3$ whose pulse generating timing varies in accordance with the output from the digital-analogue converter. Other component elements corresponding to those shown in FIG. 5 are designated by the same reference numerals. In FIG. 10, the elements starting from the digital computer $20_1$ to thyristor rectifier $17_1$ comprise the optimum control device. The calculation of the optimum control signal is made by the digital computer by writing necessary data in a memory device of the computer by a typewriter T, for example. More particularly, for the purpose of producing the field voltage as shown in FIG. 9a, a signal which has been converted into a gate voltage corresponding to the output voltage of the thyrister rectifier $17_1$ is applied to pulse generator $20_3$ from digital computer $20_1$ via digital-analogue converter $20_2$, thus controlling the phase angle of the gate voltage of the thyristor rectifier $17_1$. The assembly of thyristor rectifier $17_1$ and pulse generator $20_3$ is herein termed "excitation control apparatus". When a signal shown by FIG. 9a is produced by the digital-analogue converter $20_2$ the field coil current $I_T$ builds up linearly after a slight delay as shown in FIG. 9b. When the current $I_T$ reaches the prescribed value the minimum time control afforded by the digital computer $20_1$ is terminated and the field control is switched to a feedback control.

Among the feedback control is included a conventional system and Riccati a optimum feedback system. According to the latter system the control is optimized by using the calculated feedback coefficient so as to minimize a given quandratic performance function.

As has been described hereinabove, according to this invention it is possible to generate an output of a desired waveform in a desired time by performing an optimum control whereby a source suitable for use in nuclear fusion laboratories is provided. Although, the field excitation was calculated according to a linear programming, a non-linear programming can also be used. It should be understood that the control system of this invention is also applicable to apparatus requiring similar output control other than the source for nuclear fusion laboratories.

We claim:

1. A control system for a generator comprising:
   a generator having a field winding,
   a digital computer, said digital computer including memory means for storing a predetermined optimum pattern of the field excitation of said generator,
   a digital analogue converter for converting the digital signal produced by said digital computer into an analogue signal for controlling the excitation of said field winding,
   a load energized by said generator, said load comprising a plasma device including a field coil requiring an excitation current having a rectangular waveform, and
   means responsive to said optimum pattern for causing said computer to generate an optimum control signal required by the characteristics of said load, thereby controlling the field excitation of said generator in accordance with said optimum control signal.

2. The control system according to claim 1 wherein said generator comprises a synchronous generator.

3. The control system according to claim 1 wherein said means for controlling the field excitation comprises a gate controlled rectifier element connected to said generator field winding, and a pulse generator responsive to said analogue signal for producing a pulse adapted to control said gate controlled rectifier element.

* * * * *